(12) United States Patent
Shackelford

(10) Patent No.: US 8,176,285 B2
(45) Date of Patent: May 8, 2012

(54) IMPORTING MEDIA CONTENT ITEMS

(75) Inventor: Mark Shackelford, San Jose, CA (US)

(73) Assignee: Apple Inc., Cupertino, CA (US)

( * ) Notice: Subject to any disclaimer, the term of this patent is extended or adjusted under 35 U.S.C. 154(b) by 377 days.

(21) Appl. No.: 12/610,195

(22) Filed: Oct. 30, 2009

(65) Prior Publication Data

US 2011/0107048 A1    May 5, 2011

(51) Int. Cl.
*G06F 12/00* (2006.01)
(52) U.S. Cl. ........................................................ 711/165
(58) Field of Classification Search .................. None
See application file for complete search history.

(56) References Cited

U.S. PATENT DOCUMENTS

| | | |
|---|---|---|
| 5,179,651 A | 1/1993 | Taaffe et al. |
| 5,577,188 A | 11/1996 | Zhu |
| 6,075,545 A | 6/2000 | De Bonet et al. |
| 6,657,621 B2 | 12/2003 | Staudacher |
| 7,293,006 B2 | 11/2007 | Beckius et al. |
| 7,362,894 B2 | 4/2008 | Ono et al. |
| 8,015,167 B1 * | 9/2011 | Riggs et al. .................... 707/705 |
| 2010/0281383 A1 * | 11/2010 | Meaney et al. ................ 715/723 |

* cited by examiner

*Primary Examiner* — Hiep Nguyen
(74) *Attorney, Agent, or Firm* — Fish & Richardson P.C.

(57) ABSTRACT

Systems and techniques are disclosed for allowing a user to view and edit media content items while those media content items are being transferred from one location to another. For example, a method can include receiving a request to transfer a media content item from a source memory location where the media content item resides to a destination memory location; reading from the source memory location a sufficient amount of data to create in a database associated with the application a first record corresponding to the media content item to be transferred, the first record including a pointer to the source memory location of the media content item; initiating a transfer of the media content item to the destination memory location, and making the media content item available for manipulation prior to completion of the transfer of the first media content item.

25 Claims, 3 Drawing Sheets

IMPORTING MEDIA CONTENT ITEMS

TECHNICAL FIELD

This disclosure relates to transferring and manipulating media content items.

BACKGROUND

Digital photography and digital videography have simplified taking, viewing, storing, and reproducing media content such as still images and video. Photographs can be taken either using high-end equipment such as digital single lens reflex (SLR) cameras, low resolution cameras including point-and-shoot cameras and cellular telephone devices with suitable capabilities. Video can be taken either using high-end professional equipment, hand held cameras such as a camcorders, digital video cameras, and cellular telephone devices with suitable capabilities. Photographs and video can be transferred from one location to another location such as from one data storage device to another data storage device, or from one location on a data storage device to another location on a data storage device.

Software applications can be used to store, display, and edit digital media content obtained from a camera, video camera, or any other electronic image in a digital format. Such software applications provide a user in possession of a large repository of digital media content with the capabilities to organize, view, and edit photographs and video.

SUMMARY

This document describes systems, methods, and devices for transferring media content items from a source to a destination location while allowing a user to view and edit the media content items as if the items had already been transferred to the destination location. Among other potential advantages, the systems and techniques described here may enable a software application to behave, from the perspective of a user of that application, as if items of media content had already been copied from a source location (e.g., memory in a digital camera) to a destination location (e.g., memory in a desktop computer to which the digital camera is communicatively coupled) corresponding to a data storage area associated with the software application. For example, when importing multiple media content items (e.g., digital images residing on a flash memory card inserted in a digital camera) into a media management application (e.g., Aperture or iPhoto from Apple, Inc.), one or more of the multiple media content items can be selected by a user of the application and, in the case of a digital image, made available for display and/or manipulation (e.g., editing, organizing, exporting etc.) by a user. In other words, the one or more media content items can be edited or otherwise accessed by the user while the items are being transferred in the background, and without the user's awareness, from one memory location to another memory location, such as from a media capture device to a disk drive or other non-volatile memory device.

In a first aspect, a computer readable medium can be encoded with a computer program, the program including instructions that when executed by a data processing apparatus cause the data processing apparatus to perform operations including: receiving a request to import a media content item into an application, the media content item residing at a source memory location, wherein import includes copying the media content item to a destination memory location; reading from the source memory location a sufficient amount of data to create in a database associated with the application a first record corresponding to the media content item to be imported, the first record including a pointer to the source memory location of the media content item; initiating a copy of the media content item from the source memory location to the destination memory location; and making the media content item available for manipulation prior to completion of the copy by using the pointer to the source memory location of the media content item.

Implementations can include any or all of the following features. The program can include further instructions that when executed by the data processing apparatus cause the data processing apparatus to perform operations including: upon completion of the copy, changing the pointer in the first record to point to the copied media content item at the destination memory location. Also, the copy can a background process hidden from a user. Additionally, making the media content item available for manipulation prior to the completion of the copy can further include displaying a selectable thumbnail of the media content item. Also, the program can include further instructions that when executed by the data processing apparatus cause the data processing apparatus to perform operations including creating in the database a second record for storing changes to the media content item; receiving an adjustment to the media content item prior to completion of the copy; and storing the adjustment to the second record.

In another aspect, a computer readable medium can be encoded with a computer program, the program including instructions that when executed by a data processing apparatus cause the data processing apparatus to perform operations including: generating a first record associated with a media content item stored on a first memory device, the first record including a pointer for the media content item that identifies a first memory location of the media content item on the first memory device; initiating a transfer of multiple media content items stored on the first memory device, including the media content item, to a destination; receiving an adjustment corresponding to the media content item before the transfer of the media content item is complete; and modifying the pointer for the media content item to identify a second memory location of the media content item at the destination after the media content item has been transferred.

Implementations can include any or all of the following features. The destination can correspond to a second memory device. Also, the destination can correspond to the first memory device. The program can include further instructions that when executed by the data processing apparatus cause the data processing apparatus to perform operations including storing the adjustment corresponding to the media content item to a second record associated with the media content item. Additionally, the storing the adjustment operation is performed prior to the modifying the pointer operation.

Also, the first record and the second record can be stored in a database associated with a media management application. Additionally, Initiating a transfer of the multiple media content items, including the media content item, to a destination further can include initiating a copy-and-paste of the multiple media content items, including the media content item, to the destination. The program can include further instructions that when executed by the data processing apparatus cause the data processing apparatus to perform operations including: prior to the receiving an adjustment operation, displaying a selectable representation of each of the multiple media content items, including a selectable representation of media content item; receiving a selection of the media content item; and displaying the media content item in a user interface.

In another aspect, a system can include a first memory device for storing media content items including a first media content item; and a computing system including processor electronics configured to perform operations including: receiving a request to transfer a media content from a source memory location where the media content item resides to a destination memory location, reading from the source memory location a sufficient amount of data to create in a database associated with the application a first record corresponding to the media content item to be transferred, the first record including a pointer to the source memory location of the media content item, initiating a transfer of the media content item to the destination memory location, and making the media content item available for manipulation prior to completion of the transfer of the first media content item.

Implementations can include any or all of the following features. The computing system can be further configured to perform the operations including modifying the pointer for the media content item to identify the destination memory location after the media content item has been transferred. Also, the destination memory location can correspond to a second memory device. Additionally, the computing system can be further configured to perform the operations including: creating in the database associated with the application a second record corresponding to the media content item, the second record for storing adjustments made to the media content item; displaying the media content item prior to completion of the transfer; receiving an adjustment to the media content item; and storing the adjustment corresponding to the first media content item to the second record. Also, initiating a transfer of the media content item can further include initiating a copy-and-paste of the media content item. Additionally, making the first media content item available for manipulation can further include displaying a selectable thumbnail of the media content item; and the computing system can be further configured to perform the operations including receiving a selection of the first media content item and displaying the first media content item in a user interface.

In another aspect, a computer-implemented method can include: receiving a request to import media content items into an application, the media content items residing at a source, wherein import includes copying the media content items to a destination; reading from the source a sufficient amount of data to create in a database associated with the application a first record for each of the media content items, each first record including a pointer to a source memory location at the source for each of the respective media content items; initiating a copy of the media content items from the source to the destination; and making the media content items available for manipulation prior to completion of the copy by using the pointers to the source memory location of each of the respective media content items.

Implementations can include any or all of the following features. As the copy of each of the media content items copy completes, the pointer for the copied media content items can be changed to point to the respective copied media content items at the destination. Also, making the media content items available for manipulation prior to the copy further can include displaying a selectable thumbnail of each of the media content items. Also, the method can also including creating in the database a second record for storing changes to the media content items.

In another aspect, a computer readable medium can be encoded with a computer program, the program can include instructions that when executed by a data processing apparatus cause the data processing apparatus to perform operations including: receiving a request to import media content items into an application, the media content items residing at a source, wherein import includes copying the media content items to a destination; reading from the source a sufficient amount of data to display a selectable representation of each of the media content items and to create in a database associated with the application a first record for each of the media content items, each first record including a pointer to a source memory location at the source for each of the respective media content items; initiating a copy of the media content items from the source to the destination; and making the media content items available for manipulation prior to completion of the copy by using the pointers to the source memory location of each of the respective media content items, where in making the media content items available for manipulation further includes displaying a selectable representation of each of the media content items; and receiving a selection of one of the media content items to be manipulated prior to completion of the copy.

Implementations can include any or all of the following features. The program can include further instructions that when executed by the data processing apparatus cause the data processing apparatus to perform operations including: displaying the selected media content item; and receiving a manipulation for the selected media content item before the copy of the selected media content items begins and while another of the media content items is being copied.

Details of one or more implementations are set forth in the accompanying drawings and the description below. Other features, and advantages will be apparent from the description and drawings, and from the claims.

DESCRIPTION OF DRAWINGS

Like reference symbols in the various drawings indicate like elements.

DETAILED DESCRIPTION

A user who imports a group of media content items, such as photos or video clips, into a editing program must often wait for a considerable amount of time for the media content items to transfer from one storage device to another (e.g. from a storage device in a camera to a storage device in a personal computer) before the user can begin editing the media content items. The techniques and systems disclosed herein allow a user to access, display, and manipulate content items while those media content items are being transferred from one location to another such that it appears to the user as if those media content items had already been transferred.

For example, when multiple media content items are imported into a media management application such as from a source on a storage device on a digital camera to a destination on a personal computer, the media management application can read enough information from the source to catalog the media content items and display a user-selectable representation (e.g. a thumbnail) of each of the media content items in the media management system as if the media content items had already been imported into the media management application. The cataloging can include creating a database record for each of the multiple media content items with a pointer that identifies the location of the multiple media content items at the source. A user can immediately select one or more of the multiple media content items and begin editing while the multiple media content items are being transferred in the background. Once the multiple media content items have been transferred to the computer, the pointer can be changed to identify the destination location on the personal computer where the media content items have been transferred.

Figure 1:
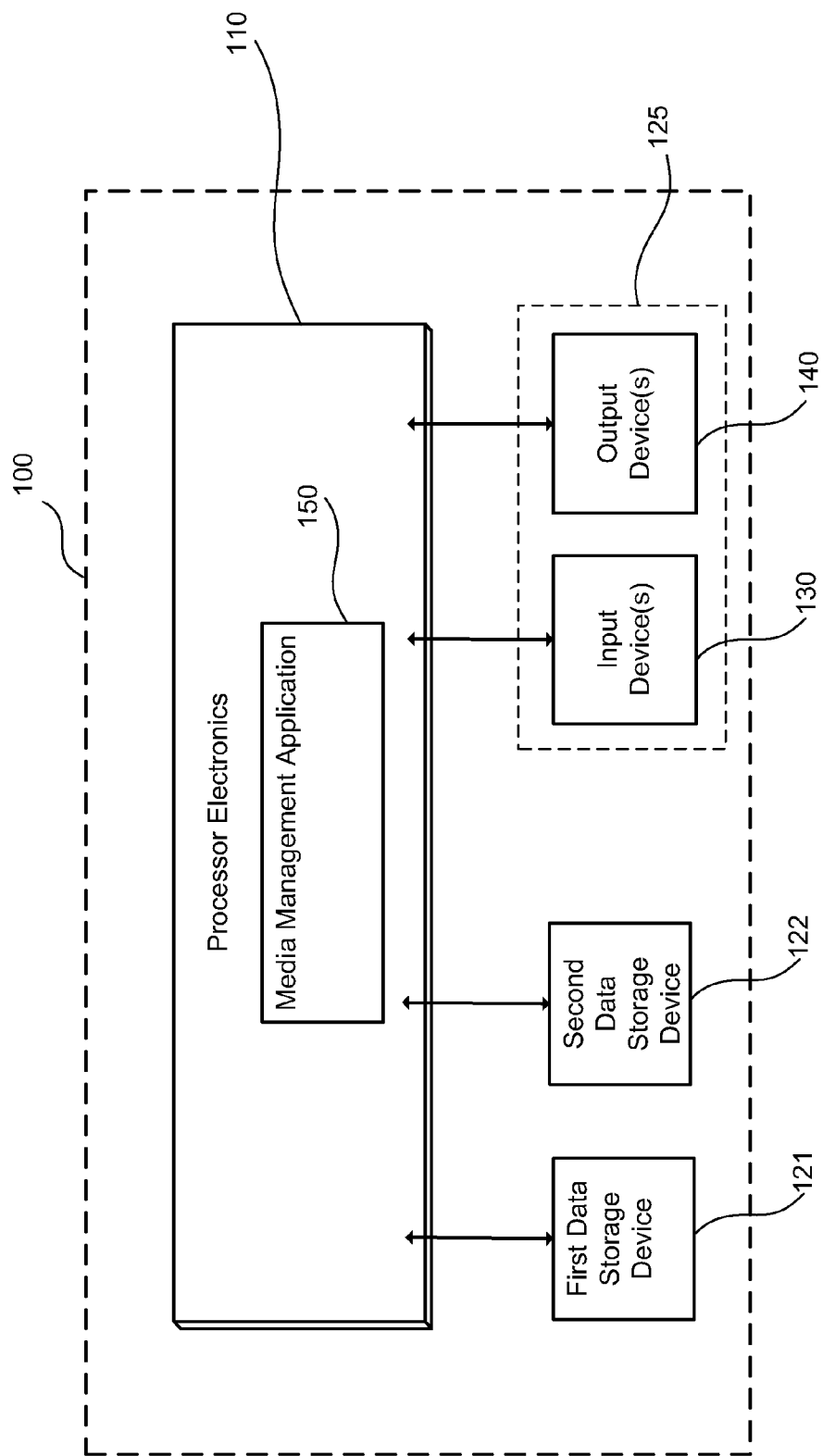
FIG. 1 is a schematic that shows an example of a system for managing media content items.

FIG. 1 is a schematic that shows an example of a system 100 for managing media content items. The system 100 includes processor electronics 110, such as a data processing apparatus, communicatively connected to a first data storage device 121, to a second data storage device 122, and to a user interface 125. The user interface 125 can include one or more input devices 130 (e.g. a mouse, a keyboard, etc.), and one or more output devices 140 (e.g. a monitor, speakers, etc.). The data processing electronics 110 can also operate a media management application 150 for organizing and/or editing media content items.

The first and second data storage devices 121, 122 can include various types of data storage devices capable of storing media content items, such as memory cards, flash media, hard drives (e.g., internal hard drives, external hard drives), USB drives, optical media, and the like. Media content items can include, for example, digital video segments, digital photographs, and/or any electronic image regardless of how it was generated, e.g., a video cartoon, animation, CAD drawing, a scanned photograph, scanned hand drawing, and the like. Also, the first and second data storage devices 121, 122 can be communicatively connected to the processor electronics 110 via a communications network, via a wireless communications link, and/or via a cable connection (e.g. via USB, a high speed serial bus, parallel port, SCSI, SATA, IDE, etc.).

The media management application 150 can perform various functions. For example, the media management application can manage the transfer of images from the first data storage device 121 to the second data storage device 122. The media management application 150 can also manage the transfer of images from a location on one of the data storage devices (e.g. the second data storage device 121) to another location on the same data storage device (e.g. the second data storage device 121).

A user can interface with the media management application via user interface 125. The media management application can receive functions from the user to be performed by the media management application. For example, a user can modify a media content item displayed in the media management application using an input device 130. For example, the media content item can be cropped, sharpened, highlighted, straightened, etc. Also, other examples of modifications that can be made to the media content item include white balance, color filters, and noise reduction.

Media content items can also be imported into the media management application 150. Importing media content items can include transferring images from a first location such as from a first data storage device (e.g., a data storage device associated with a digital camera) to a second location such as to a library on a second data storage device associated with the media management application 150. Transferring can also include copying or cutting-and-pasting, from first location on a storage device (e.g., a folder) to a second location such as a library and the storage device. A library can be a location where the media management application organizes and stores media content items.

Importing can also include generating records, such as database records, for each of the images imported into the media management application. The records for multiple media content items can be organized and stored in a database associated with the media management application. A record for a media content item can include a pointer (e.g. a memory location value) that identifies the location where the media content item is stored. The pointer facilitates locating the media content item. For example, when the media management application 150 needs to locate a media content item, such as to upload it for editing, the pointer directs the media management application to the location of the media content item. Another database record for the media content item can include processing instructions for displaying the media content item. When a modification is made in the media management application to the media content item, the modification can be saved to the processing instructions. For example, in a media management application that uses non-destructive processing of media content items, modifications are saved to the processing instructions rather than being saved directly to the media content item. In such an example, the modifications can be automatically saved to the processing instructions as the modifications are received, such that a user does not have to manually save the changes. When a media content item is displayed, the processing instructions can be applied like a filter through which the media content item is viewed.

Other records associated with a media content item can include other types of metadata. For example, a user can input keywords that are associated with a media content item to help facilitate organization and searching. In such an example, the media management application 150 can create a record that stores such keywords.

In some examples, a user can manipulate the media management application to manually browse to and select a group of media content items to be imported into the media management application 150. In other examples, images can be imported automatically. For example, the media management application 150 can be configured to automatically import media content items from a first data storage device 121 such as a data storage device on a camera to a second data storage device 122 when the camera is communicatively connected to the processor electronics 110. When media content items are imported, the media management application can transfer the media content items to a second data location and can automatically create records for each of the media content items.

Figure 2:
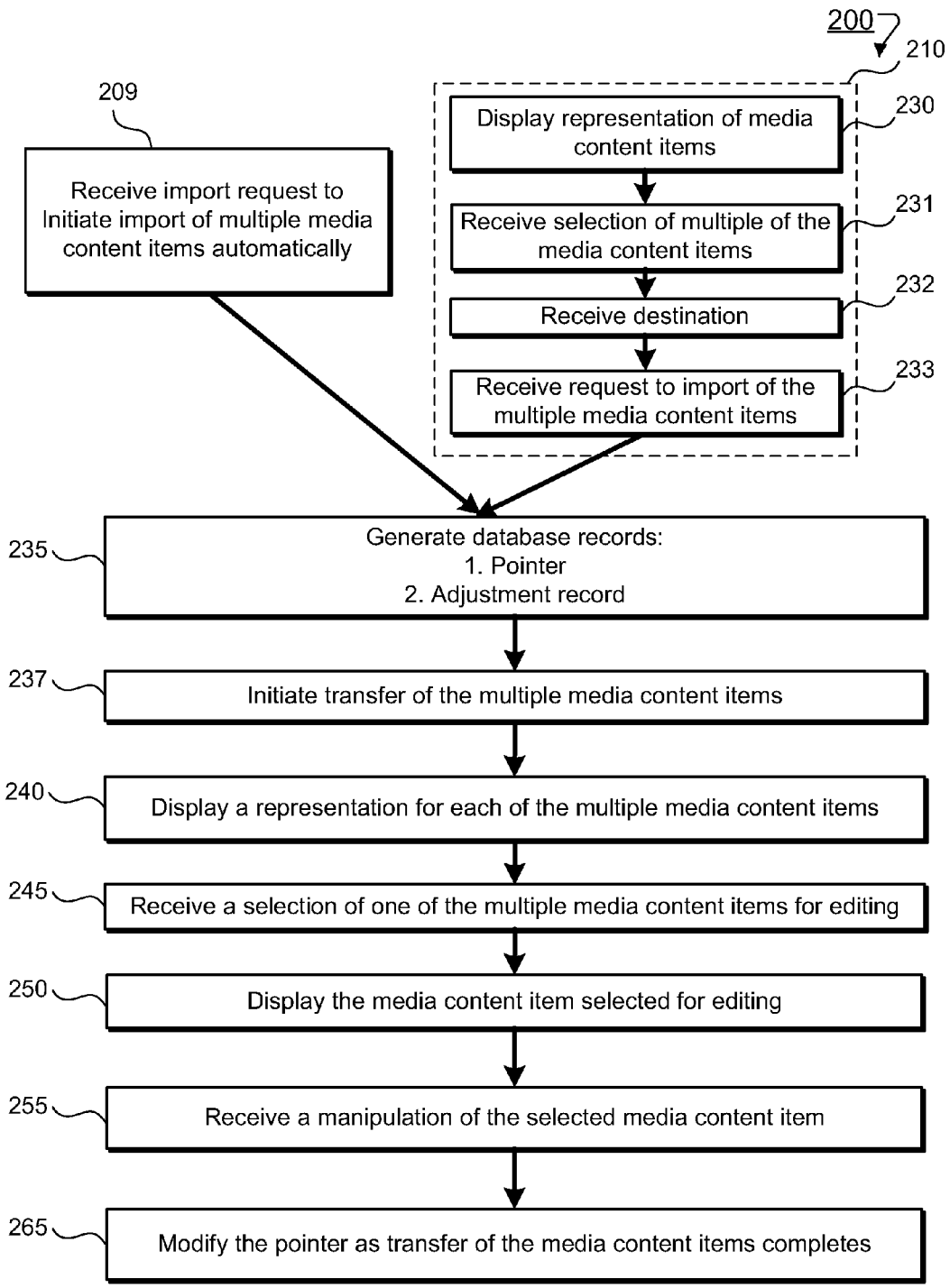
FIG. 2 shows an example process importing media content items into a media management application.

FIG. 2 shows an example process 200 for importing media content items into a media management application. Importing can include transferring media content items from a source location (e.g., a flash memory card inserted in a user's digital camera) to a destination location (e.g., a hard drive on a desktop computer) while one or more of the media content items remain accessible to user (e.g., editable and viewable) of a software application (e.g., a digital image manipulation or organization application). In some examples, the media content items can be transferred from a first folder on a data storage device to a second folder on the same data storage device. In other words, the import process 200 can occur on media content items already stored on destination storage device but not yet run through the import process. In other examples, the media content items can be transferred from a location on a first data storage device to a location on a second data storage device that is different from the first data storage device.

First, a request to import multiple media content items is received manually or automatically. A request to import can be received automatically 212, for example, when a data storage device associated with a camera is communicatively connected to a personal computer. The computer can detect the data storage device automatically and can initiate import of all of the media content items stored on the data storage device.

The process 200 can also allow a user to manually initiate an import of a selection of multiple media content items at 230-233. When manually initiating an import of media content items, a representation such as a thumbnail of each of the media content items accessed is displayed 230 such as on a display in a user interface. A selection of multiple of the media content items for import is received at 231. For example, a user can use a user interface to manually select media content items to be imported. In some examples, a destination can also optionally be selected at 232. For example, a user can use the user interface to browse to a destination for the media content items being imported. In other examples, a destination can be set automatically or set by default, for example, to a media content library associated with the media management application that is importing the media content items. At 233, a request to import the selected multiple media content items is received. For example, once multiple of the media content items for import have been selected, a user can indicate, using a user interface, that import is to begin.

At 235 and 237, import of the multiple media content items designated for import begins. The process 200 reads sufficient information from the source to generate 235 one or more database records for each of the multiple media content items. A database record can be generated for each of the multiple media content items that includes a pointer (e.g., a memory location value) that identifies a location for each of the multiple media content items. When import is initiated, the multiple media content items reside at the source. Therefore, the pointer for each of the multiple media content items identifies a location at the source. For example, if the source for a particular one of the multiple media content items is a file on a data storage device associated with a digital camera, the pointer for that particular media content item can be a filepath on the data storage device corresponding to that media content item. Also, an adjustment record for each of the multiple media content items can be generated. Initiating importing also includes initiating a transfer (e.g. copy-and-pasted or cut-and-paste) at 237 of the multiple media content items from the source to a destination.

As soon as import has been initiated, the multiple media content items become immediately accessible (e.g. user selectable, displayable, and manipulatable), in the media management application, as if the multiple media content items had already been imported even though the media content items are transferring from the source to the destination in the background. For example, at 240 a user-selectable representation for each of the multiple media content items can be immediately displayed e.g., in the media management application. A representation for each of the multiple media content items can include a thumbnail of each of the multiple media content items.

While the multiple media content items are still transferring, a selection of one of the multiple media content items (e.g. a selection of one of the user-selectable representations) for editing is received at 245. The selected media content item can be uploaded from the source and displayed in the media management application for editing. Uploading a media content item can include loading the media content item into volatile operating memory from the source. The selected media content item is displayed in a user interface at 250 for editing. For example, the selected media content item can be displayed in the media management application configured to edit images. At 255, the selected media content item can be manipulated. Any operation that can be performed by the media management application, can be performed on the selected media content item as the multiple media content items are transferring. For example, one or more adjustments to the selected media content item can be received, using the media management application. A user can also export images from the media management application where the images appear to have been imported.

As the transfer of the multiple media content items completes, the pointer for each of the multiple media content items is modified at 265 from identifying a location at the source to identifying a location at the destination where the media content items were transferred. For example, a pointer can be modified to identify the location of the selected media content item at the destination by identifying a filepath of the selected media content item at the destination. The filepath at the destination can be located in a library associated with the media management application. Transferring a selected media content item can include copying the media content item from the source to the destination. A copy of the media content item can be left at the source. In some examples, transferring can include moving the media content item from the source and copying it to the destination. In such an example, the media content item is deleted from the destination, after the pointer has been modified at 265.

Also, one or more adjustments made at 255 can be stored (i.e. saved) to the adjustment record associated with the selected media content item that was generated at step 235. The adjustment can be stored to the adjustment record anytime during the process 200. For example, the adjustments can be saved to the adjustment record as the adjustments are received such as when the multiple media content items are being transferred, or even when the selected media content item is being transferring. Also, a user can continue to work on a media content item after the multiple media content items have been transferred and after the pointer has been modified at 265.

The adjustment record for a particular media content item can include processing instructions, such as those used in non-destructive processing and editing of media content items. In some examples, such as for destructive processing of a media content item, the adjustment record can include a temporary store of adjustments made to the media content item while the media content item is being transferred. After the media content item has been transferred, the edits stored in the temporary store can be written to the media content item at the destination.

Process 200 allows a user to quickly view, select, and manipulate media content items being imported. Once import of the multiple media content items has been initiated, import appears near instantaneous because process 200 allows user to view, select, and edit in a media management application any of the multiple media content items while those multiple media content items are being transferred in the background.

Figure 3:
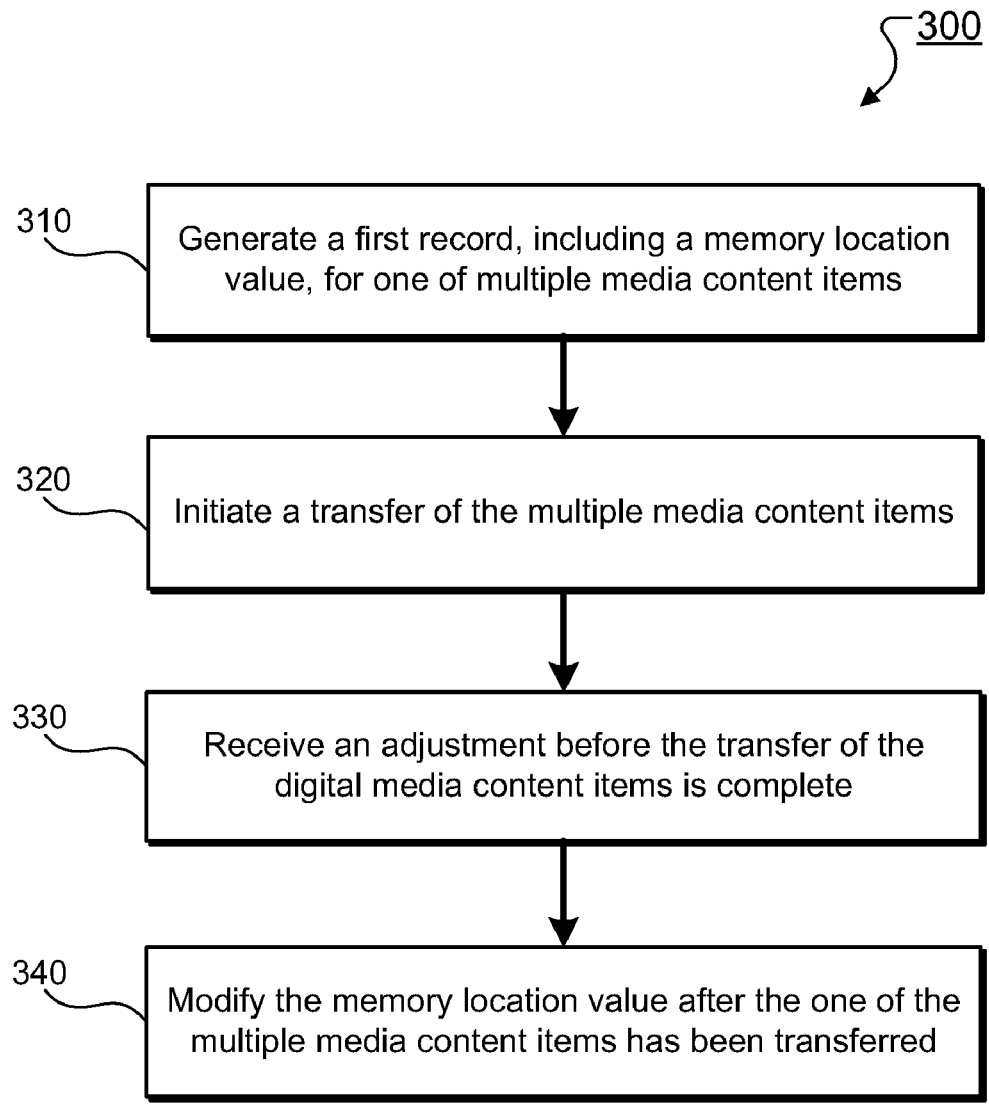
FIG. 3 shows example process for transferring media content items from one location to another location while one or more of the media content items are being edited.

FIG. 3 shows example process 300 for transferring media content items from one location to another location while one or more of the media content items are being edited. At 310, a first record is generated. The first record is associated with a first media content item—one of multiple media content items stored on a first memory device. The first record includes a memory location value for the first media content item that identifies a first memory location corresponding to the first memory device.

At 320, a transfer of the multiple media content items is initiated. The transfer of the multiple media content items includes the first media content item. The transfer is a transfer of the multiple media content items from the first memory location to a second memory location at a destination. The second memory location at the destination can correspond to a second memory device. In other examples, the second memory location can correspond to the first memory device but be a location different from the first memory location. The transfer can include copying-and-pasting. The transfer can also include cutting-and-pasting the multiple media content items from the first memory location to the second memory location.

At 330, an adjustment corresponding to the first media content item is received. For example, an adjustment can be received from a user using a media management application to edit the one of the multiple media content items. The adjustment is received before the transfer of the multiple media content items is complete. For example, the adjustment can be made wile the first media content is being transferred. Also, the adjustment can be made before the transfer of the first media content item begins and while other of the multiple media content items are being transferred.

At 340, the memory location value for the one of the multiple digital media content items is modified. The memory location value is modified to identify the second memory location after the one of the multiple digital media content items has been transferred.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a machine or computer readable medium. The machine or computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Particular implementations have been described in this document. Variations and enhancements of the described implementations and other implementations can be made based on what is described and illustrated in this document. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer readable medium encoded with a computer program, the program comprising instructions that when executed by a data processing apparatus cause the data processing apparatus to perform operations comprising:
   receiving a request to import a media content item into an application, the media content item residing at a source memory location, wherein import comprises copying the media content item to a destination memory location;
   reading from the source memory location a sufficient amount of data to create in a database associated with the application a first record corresponding to the media content item to be imported, the first record including a pointer to the source memory location of the media content item;
   initiating a copy of the media content item from the source memory location to the destination memory location; and
   making the media content item available for manipulation prior to completion of the copy by using the pointer to the source memory location of the media content item.

2. The computer readable medium of claim 1, wherein the program comprises further instructions that when executed by the data processing apparatus cause the data processing apparatus to perform operations comprising:
   upon completion of the copy, changing the pointer in the first record to point to the copied media content item at the destination memory location.

3. The computer readable medium of claim 1, wherein the copy is a background process hidden from a user.

4. The computer readable medium of claim 1, wherein making the media content item available for manipulation prior to the completion of the copy further comprises displaying a selectable thumbnail of the media content item.

5. The computer readable medium of claim 1, wherein the program comprises further instructions that when executed by the data processing apparatus cause the data processing apparatus to perform operations comprising:
   creating in the database a second record for storing changes to the media content item;
   receiving an adjustment to the media content item prior to completion of the copy; and
   storing the adjustment to the second record.

6. A computer readable medium encoded with a computer program, the program comprising instructions that when executed by a data processing apparatus cause the data processing apparatus to perform operations comprising:
   generating a first record associated with a media content item stored on a first memory device, the first record including a pointer for the media content item that identifies a first memory location of the media content item on the first memory device;
   initiating a transfer of multiple media content items stored on the first memory device, including the media content item, to a destination;
   receiving an adjustment corresponding to the media content item before the transfer of the media content item is complete; and
   modifying the pointer for the media content item to identify a second memory location of the media content item at the destination after the media content item has been transferred.

7. The computer readable medium of claim 6, wherein the destination corresponds to a second memory device.

8. The computer readable medium of claim 6, wherein the destination corresponds to the first memory device.

9. The computer readable medium of claim 6, wherein the program comprises further instructions that when executed by the data processing apparatus cause the data processing apparatus to perform operations comprising storing the adjustment corresponding to the media content item to a second record associated with the media content item.

10. The computer readable medium of claim 9, wherein the storing the adjustment operation is performed prior to the modifying the pointer operation.

11. The computer readable medium of claim 9, wherein the first record and the second record are stored in a database associated with a media management application.

12. The computer readable medium of claim 6, wherein initiating a transfer of the multiple media content items, including the media content item, to a destination further comprises initiating a copy-and-paste of the multiple media content items, including the media content item, to the destination.

13. The computer readable medium of claim 6, wherein the program comprises further instructions that when executed by the data processing apparatus cause the data processing apparatus to perform operations comprising:
   prior to the receiving an adjustment operation, displaying a selectable representation of each of the multiple media content items, including a selectable representation of media content item;
   receiving a selection of the media content item; and
   displaying the media content item in a user interface.

14. A system comprising:
   a first memory device for storing media content items including a first media content item; and
   a computing system including processor electronics configured to perform operations comprising:
      receiving a request to transfer a media content from a source memory location where the media content item resides to a destination memory location;
      reading from the source memory location a sufficient amount of data to create in a database associated with the application a first record corresponding to the media content item to be transferred, the first record including a pointer to the source memory location of the media content item;
      initiating a transfer of the media content item to the destination memory location, and
      making the media content item available for manipulation prior to completion of the transfer of the first media content item.

15. The system of claim 14, wherein the computing system is further configured to perform the operations comprising: modifying the pointer for the media content item to identify the destination memory location after the media content item has been transferred.

16. The system of claim 15, wherein the destination memory location corresponds to a second memory device.

17. The system of claim 14, wherein the computing system is further configured to perform the operations comprising:

creating in the database associated with the application a second record corresponding to the media content item, the second record for storing adjustments made to the media content item;

displaying the media content item prior to completion of the transfer;

receiving an adjustment to the media content item; and storing the adjustment corresponding to the first media content item to the second record.

18. The system of claim 14, wherein initiating a transfer of the media content item further comprises initiating a copy-and-paste of the media content item.

19. The system of claim 14, wherein making the first media content item available for manipulation further comprises displaying a selectable thumbnail of the media content item; and wherein the computing system is further configured to perform the operations comprising receiving a selection of the first media content item, and displaying the first media content item in a user interface.

20. A computer-implemented method comprising:

receiving a request to import media content items into an application, the media content items residing at a source, wherein import comprises copying the media content items to a destination;

reading from the source a sufficient amount of data to create in a database associated with the application a first record for each of the media content items, each first record including a pointer to a source memory location at the source for each of the respective media content items;

initiating a copy of the media content items from the source to the destination; and making the media content items available for manipulation prior to completion of the copy by using the pointers to the source memory location of each of the respective media content items.

21. The method of claim 20, further comprising: as the copy of each of the media content items copy completes, changing the pointer for the copied media content items to point to the respective copied media content items at the destination.

22. The method of claim 20, wherein making the media content items available for manipulation prior to the copy further comprises displaying a selectable thumbnail of each of the media content items.

23. The method of claim 20, further comprising:

creating in the database a second record for storing changes to the media content items.

24. A computer readable medium encoded with a computer program, the program comprising instructions that when executed by a data processing apparatus cause the data processing apparatus to perform operations comprising:

receiving a request to import media content items into an application, the media content items residing at a source, wherein import comprises copying the media content items to a destination;

reading from the source a sufficient amount of data to display a selectable representation of each of the media content items and to create in a database associated with the application a first record for each of the media content items, each first record including a pointer to a source memory location at the source for each of the respective media content items;

initiating a copy of the media content items from the source to the destination; and making the media content items available for manipulation prior to completion of the copy by using the pointers to the source memory location of each of the respective media content items, where in making the media content items available for manipulation further comprises displaying a selectable representation of each of the media content items; and receiving a selection of one of the media content items to be manipulated prior to completion of the copy.

25. The computer readable medium of claim 24, wherein the program comprises further instructions that when executed by the data processing apparatus cause the data processing apparatus to perform operations comprising:

displaying the selected media content item; and receiving a manipulation for the selected media content item before the copy of the selected media content items begins and while another of the media content items is being copied.

* * * * *